United States Patent [19]

Kirby-Smith

[11] Patent Number: 4,554,827

[45] Date of Patent: Nov. 26, 1985

[54] WIND INDICATORS

[75] Inventor: Trevor R. Kirby-Smith, Woking, England

[73] Assignee: The Secretary of State for Defence in Her Britannic Majesty's Government of the United Kingdom of Great Britain and Northern Ireland, London, England

[21] Appl. No.: 598,433

[22] Filed: Apr. 9, 1984

[30] Foreign Application Priority Data

Apr. 14, 1983 [GB] United Kingdom ................ 8310177

[51] Int. Cl.⁴ .............................................. G01P 13/00
[52] U.S. Cl. ....................................... 73/189; 116/209
[58] Field of Search ................. 73/188, 189; 116/264, 116/273, 206, 209, 210, 211, DIG. 9, DIG. 43; 244/142, 147, 149, 152

[56] References Cited

U.S. PATENT DOCUMENTS

| 2,045,521 | 6/1936 | Hertelendy | 73/188 |
| 2,439,598 | 4/1948 | Dinsley | 116/206 |
| 3,164,801 | 1/1965 | Nicholl | 116/209 |
| 3,458,161 | 7/1969 | Pohl et al. | 244/152 |
| 3,804,698 | 4/1974 | Kinloch | 244/147 |
| 3,869,913 | 3/1975 | Niskin | 73/188 |
| 4,039,164 | 8/1977 | Booth | 244/149 |

Primary Examiner—Steven L. Stephan
Assistant Examiner—Patrick Scanlon
Attorney, Agent, or Firm—Cushman, Darby & Cushman

[57] ABSTRACT

A device for indicating windspeed and direction to a parachutist and comprising a datum element for plummetting to the ground, a status element having a parachute for floating to the ground, a cord linking the two elements, and different markers on each element.

15 Claims, 4 Drawing Figures

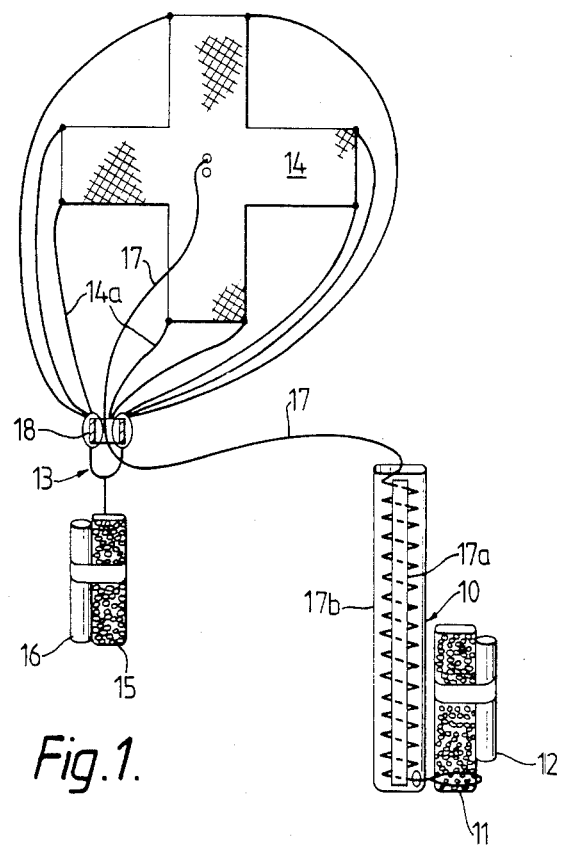
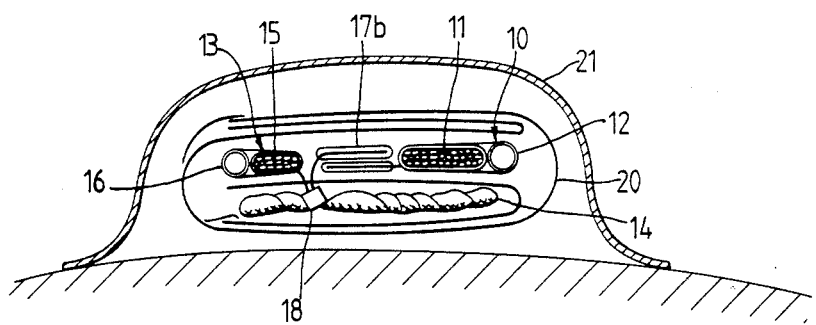
Fig.1.
Fig.2.

WIND INDICATORS

The present invention relates to wind direction indicators for use by parachutists, particularly parachutists using gliding parachutes.

By comparison with a traditional parachute the user of a gliding parachute is able to traverse fairly considerable lateral distances during his descent, and the difference between his lateral speed relative to the ground and that relative to the air affected by local wind speed and direction can be such as to affect the safety of landing. That is, if the wind is strong and behind him he could incur injuries on landing sufficient to immobilize him, whereas if it is strong and ahead his ground speed could be nil and his landing particularly safe. Moreover there are circumstances even in day time when the parachutist may not appreciate that his ground speed is dangerously high. Neither is an indication necessarily reliable if it comes from something streaming from or falling from the user, because air movement in the vicinity of the parachutist is unlikely to be representative.

The present invention provides a wind indicator which will give a parachutist adequate wind speed and direction information to enable him to adjust his ground speed before landing.

According to the present invention a wind indicator device comprises a datum element carrying a datum marker, a status element having a parachute and a marker, and a cord linking the datum element and the status element, the arrangement being such that the indicator is portable by a parachutist and droppable so that the datum element falls rapidly to the ground and the status element floats to the ground, the ground distance and direction of the status marker from the datum marker providing to the parachutist an indication of wind speed and direction.

In a first embodiment of the invention the indicator is arranged so that the status parachute is uninflated for a landing phase of the datum element, whereby the combination effectively plummets to the ground, the status element parachute only inflating after the datum element has landed. Accordingly the cord may pass freely via a collar approximate the status parachute line confluence and be attached to the apex of the status parachute canopy.

In a second embodiment the weight of the datum elemeny may be arranged to be such with respect to the size of the status element parachute as to prevent the latter affording significant resistance to free fall of the combination.

Advantageously the status parachute has a cruciform canopy, whereby wind lift effects thereon are minimised. The parachute lines may possess a degree of stiffness to enable them to avoid entanglement.

In order to ensure that the cord, which may be of the order of 30 meters long, deploys readily when the indicator is dropped, the device may include a cord store for paying out cord. A suitable cord store is described in co-pending UK Patent application of Agent's 8310176 and comprises a series of loops of the cord stuck between a pair of adhesive tapes, one end of the store being anchored to the datum element. The adhesive may be a wax.

Preferably the cord is so stored that when deployment of the device is initiated by the device being allowed to fall freely as a whole, the parachute inflates in order for the status element to float downward while the datum element is plummetting and cord is paying out from the store.

Whilst the wind indicator may be arranged to be deployed progressively from the person, with the apparently concomitant possibility of minimising the distance between the device and the user just prior to his landing, it is much preferred for it to be arranged to be released from the person as a whole and to deploy after release. This latter mode of deployment minimises the possibility of parachutist motion affecting the final relative positions of the datum and status markers.

Accordingly the device may have a pouch attachable to the person, be releasable as a whole therefrom, and arranged to deploy progressively thereafter, as above described.

At least the datum marker may have ribbons of a glowing fabric, such as a fabric coated with a phosphorescent, e.g. 'DAYGLO' (TM), preparation. Both markers may incorporate light emitters of the type comprising two fluids which emit light upon mixing. A typical example is the "Cyalume' (Registered Trade Mark of American Cyanamid Co) light-stick which is activated by flexing the tube. Preferably the datum and status markers are different colours.

Typically the datum element has weight of order of 0.4-0.5 Kg, and the status parachute carries a load of 0.15-0.25 Kg. These weights may comprise lead shot, so that the whole wind indicator can be so packed that single flexure prior to dropping activates the marker light. However the loads may comprise parts of a parachutist's other equipment when weight is at a great premium.

Two wind indicator devices in accordance with the present invention will now be described by way of example with reference to the accompanying drawings, of which:

FIG. 1 illustrates an unpacked indicator of a first device prior to deployment,

FIG. 2 is a schematic section of a packed indicator of the type illustrated in FIG. 1, FIG. 3 schematically illustrates a second indicator, unpacked, and FIG. 4 schematically illustrates a second indicator, packed.

Figure 3:
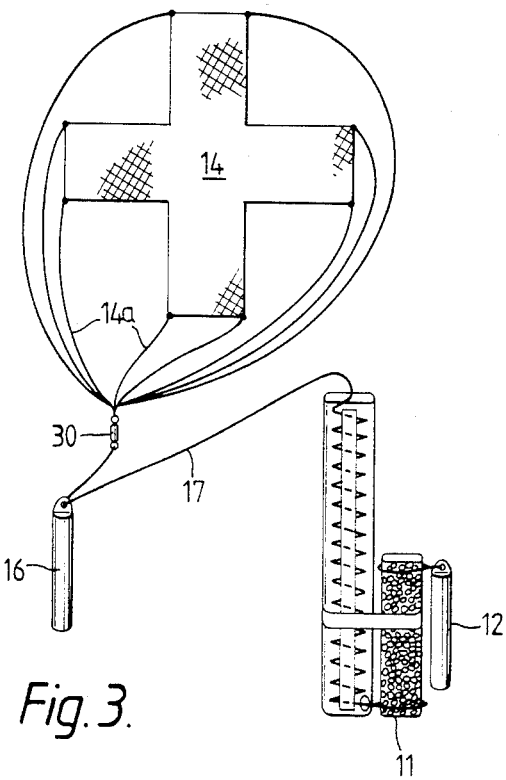

The indicator shown in FIGS. 1 and 2 comprises a datum element 10 incorporating a datum weight 11 and a datum marker 12, a status element 13 incorporating a cruciform parachute 14 with a status load 15 and a marker 16, and a cord 17 linking the datum and status elements.

The parachute has lines 14a formed of nylon cord which connect with the load 15 via a confluence ring 18, to which the lines and the load are attached. The cord 17 passes through the ring 18 and is attached to the apex of the parachute 14. The markers are 'CYALUME' (RTM) Lightsticks, the datum marker 12 being tinted orange. They are attached to their respective loads, which comprise flexible tubes of lead shot.

The cord 17 is formed into a cord store, in which a series of loops of the coard are retained in that belt array by adhesive tape 17a, attached to both sides thereof, the store being packaged in a plastics film tube 17b.

The device is packaged in a compartmented envelope 20 so flexible as to permit the lightsticks to be flexed prior to opening the envelope. The envelope 20 is attachable to the person via a cover 21, and is openable to permit the device to fall away completely.

There now follows a description of the operation deployment and use of this device by a parachutist.

Just prior to a night-time jump he gently flexes the complete device so that both lightsticks 12, 16 begin to glow (for a day time jump this may not be necessary). He then attaches the envelope 20 containing it to his clothing via the cover 21. After the jump, when he reaches a specified altitude he opens the cover 21 and the envelope 20, allowing the device to fall therefrom. The parachute 14 inflates, as a result of which the datum element 10 falls faster than the status element 13 and the cord 17 is pulled out of the store. When the cord 17 is taut it draws the apex of the parachute 14 to the confluence ring 18 deflating the parachute so that the device can plummet groundwards.

When the datum element 10 reaches the ground, tension on the cord 17 relaxes except in very strong winds, the parachute 14 re-inflates and the status element 13 then floats to the ground, the datum element 10 remaining stationary. The status element 13 then lands on the ground at a point a distance and direction from the datum element commensurate with wind speed and direction respectively.

In a typical embodiment of the invention the datum and status element weights are 0.45 Kg and 0.19 Kg respectively, and the cord 17 is 30 m long. The parachute 14 has an arm total length of 48 cm and an arm width of 12 cm and eight lines 14a 48 cm long. If this is released by a parachutist at 150 m altitude he will have 8 or 9 seconds in which to assess the wind and adjust his direction for landing.

Figure 4:
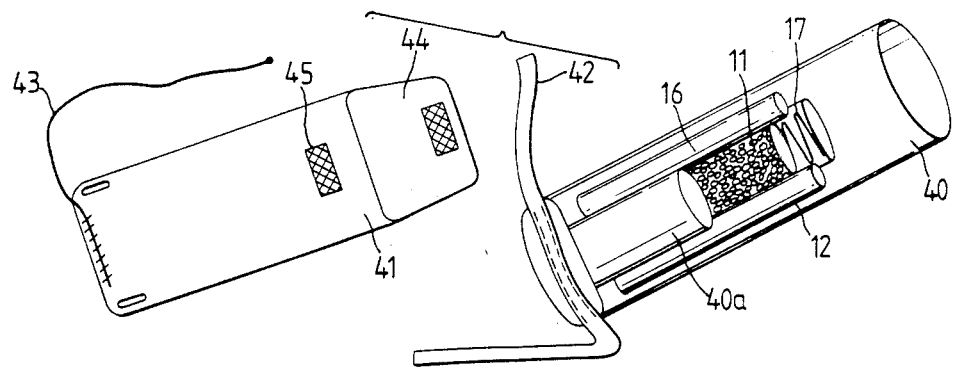

In the second embodiment of the invention, shown in FIGS. 3 and 4, the indicator itself differs from the first embodiment principally in that the status unit carries no load 15 addition to the marker 16, in place of the confluence ring 18 is a simple swivel confluence 30, and there is no facility of exchanging the marker 16 for ribbons (since the parachute canopy can be arranged for daylight visibility).

The package for the device, shown in FIG. 4, comprises a polythene tubular inner envelope 40 in which the device is arranged, with an inner tube 40a for the parachute 14, and a nylon fabric envlope 41 into which the envelope 40 can be arranged by means of tapes 42. The envelope 41 has a cord 43 by which it can be attached to the person and a flap 44, closable by touch-and-close fastener means 45, to retain closed to envelope 40.

For operation of this second embodiment, the parachutist gently bends the package to activate the light stick, if necessary, and attaches it to his person via the cord 43. When, after jumping, the parachutist has an altitude of about 150 m he opens the nylon flap 44 and points the tube 40 downward, permitting the device to slide out of the tube. Because initially there is less drag associated with the datum element than with the status element the former falls more rapidly than the latter whilst the line 17 deploys. When the line is taut the status element is caused to fall rapidly due to the mass of the datum element, until the latter hits the ground, when the status element begins to float to a location on the ground determined by wind speed and direction.

In a specific form of the second embodiment of the datum element carries a weight 11 of 0.45 Kg, while the parachute 14 has an arm length of 22 cm, an arm width of 5.5 cm and a line of a length of 30 cm.

I claim:
1. A wind indicator comprising:
  a datum element carrying a datum marker,
  a status element including a status marker and a parachute having shroud lines,
  a cord store, and
  a cord in said store linking said datum element and said parachute,
  the arrangement being such that said wind indicator is portable by a parachutist and droppable so that initially said parachute inflates and said cord pays out from said cord store, wherein said parachute is collapsed by the action of said cord when said cord becomes taut, and wherein said parachute reinflates following landing of said datum element when said cord becomes slack, and said status element then floats to the ground, the ground distance and direction of said status marker from said datum marker providing to the said parachutist an indication of wind speed and direction.

2. A wind indicator as claimed in claim 1 and wherein further said cord passes freely via a collar approximate the line confluence of said parachute, and said cord is attached to the apex of said parachute.

3. A wind indicator as claimed in claim 1 and wherein the mass of said datum element and the size of said parachute prevents the latter affording significant resistance to free fall of the combination.

4. A wind indicator as claimed in claim 1 and wherein further said parachute has a cruciform canopy, whereby wind lift effects thereon are minimised.

5. A wind indicator as claimed in claim 1 and wherein further said parachute lines posses a degree of stiffness to enable them to avoid entanglement.

6. A wind indicator as claimed in claim 1 and wherein further said cord store comprises a series of loops of said cord stuck between a pair of adhesive tapes, one end of said store being anchored to said datum element.

7. A wind indicator as claimed in claim 1 and wherein further said cord is so stored that when deployment of said indicator is initiated by the device being allowed to fall freely as a whole, the parachute inflates in order for said status element to float downward while said datum element is plummetting and cord is paying out from said store.

8. A wind indicator as claimed in claim 1 and having a pouch attachable to said parachutist, said indicator being storable within said pouch and releasable as a whole therefrom, and arranged to deploy progressively thereafter.

9. A wind indicator as claimed in claim 1 and wherein said datum marker has ribbons of a glowing fabric.

10. A wind indicator as claimed in claim 1 and wherein said markers incorporate light emitters of the type comprising two fluids which emit light upon mixing.

11. A wind speed and direction indicator comprising:
  a datum element comprising:
    (a) weight means for adding mass to said datum element; and
    (b) marker means for producing a visual indication of the location of said datum element;
  a status element connected to said datum element by a cord and comprising:
    (a) collapsable parachute means for inflating and thus producing air resistance when said cord is slack, and deflating and thus producing minimal air resistance when said cord is taut;

(b) marker means for producing a visual indication of the location of said status element; and (c) weight means for adding mass to said status element;

cord store means for containing a length of said cord and allowing said cord to unwind when said parachute is inflated;

wherein said indicator is droppable by a parachutist so that initially said parachute inflates and said cord pays out from said cord store until said cord is taut, at which time said parachute deflates, and said indicator falls rapidly to the ground said weighted datum element hitting ground first and thus causing slack in said cord and re-flating said parachute which is then blown in the direction of the wind and a distance proportional with the speed of the wind before landing.

12. A device as in claim 11 wherein said marker means is of the type comprising two or more fluids which emits light upon the mixing of the said fluids.

13. A device as in claim 12 further comprising a package for said wind speed and direction indicator and attachable to said parachutist, designed such that said fluids in said marker means can be mixed while said marker means are still in said package.

14. A device as in claim 11 wherein said weight means of said status element is merely the mass of said marker means.

15. A wind speed and direction indicator comprising:

a datum element comprising a weight and a luminescent marker;

a status element, attached to said datum element by a cord, comprising a weight, a luminescent marker and a collapsable parachute;

wherein said cord is attached form said datum element to the apex of said parachute through a collar, such that when said cord becomes taut said apex is pulled toward said collar, thus deflating said parachute and when said datum element contacts the ground said cord becomes slack and said parachute reinflates.

* * * * *